United States Patent
Dodwell et al.

(10) Patent No.: US 12,547,914 B2
(45) Date of Patent: *Feb. 10, 2026

(54) BIAS SCORING OF MACHINE LEARNING PROJECT DATA

(71) Applicant: AT&T Intellectual Property I, L.P., Atlanta, GA (US)

(72) Inventors: Emily Dodwell, Jersey City, NJ (US); Balachander Krishnamurthy, New York, NY (US); Rajat Malik, Metuchen, NJ (US); Ritwik Mitra, Trenton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,608

(22) Filed: Apr. 11, 2024

(65) Prior Publication Data

US 2024/0256926 A1 Aug. 1, 2024

Related U.S. Application Data

(60) Continuation of application No. 18/172,654, filed on Feb. 22, 2023, now Pat. No. 11,983,646, which is a
(Continued)

(51) Int. Cl.
*G06N 5/04* (2023.01)
*G06F 16/28* (2019.01)
*G06N 20/00* (2019.01)

(52) U.S. Cl.
CPC ............ *G06N 5/04* (2013.01); *G06F 16/285* (2019.01); *G06N 20/00* (2019.01)

(58) Field of Classification Search
CPC ........................................................ G06N 5/04
(Continued)

(56) References Cited

U.S. PATENT DOCUMENTS

| 11,222,347 B2 * | 1/2022 | Sprecher .......... G06Q 10/06315 |
| 2005/0114829 A1 * | 5/2005 | Robin .................... G06Q 10/06 717/101 |

(Continued)

FOREIGN PATENT DOCUMENTS

WO   WO-2006091687 A1 * 8/2006 ............. G06Q 40/00

*Primary Examiner* — Syling Yen
(74) *Attorney, Agent, or Firm* — Guntin & Gust, PLC; Dana B. LeMoine

(57) ABSTRACT

Aspects of the subject disclosure may include, for example, system and apparatus that enable operations that may include receiving, by a processing system, project data defining a proposed machine learning (ML) project of an entity and storing the project data in a project database with other project data for other projects. The operations may further include extracting extracted features of the proposed project and, based on the extracted features, determining a clustering assignment for the proposed project. Determining the clustering assignment may comprise comparing information about the proposed project including the extracted features with information about the other projects and assigning the proposed project to a cluster including one or more projects having similar bias characteristics as the proposed project. The operations may further include determining a risk of potential bias for the proposed project and, based on the risk of bias, recommending a corrective action to reduce the risk of bias. Machine learning models may be used for project clustering and bias score determination and may be readily updated as new ML projects are evaluated. Other embodiments are disclosed.

20 Claims, 9 Drawing Sheets

Related U.S. Application Data division of application No. 16/704,965, filed on Dec. 5, 2019, now Pat. No. 11,620,542.

(58) Field of Classification Search
USPC .......................................................... 707/736
See application file for complete search history.

(56) References Cited

U.S. PATENT DOCUMENTS

| | | |
|---|---|---|
| 2018/0225581 A1* | 8/2018 | Oyamada .............. G06F 16/285 |
| 2021/0174222 A1 | 6/2021 | Dodwell et al. |
| 2023/0259796 A1 | 8/2023 | Dodwell et al. |

* cited by examiner

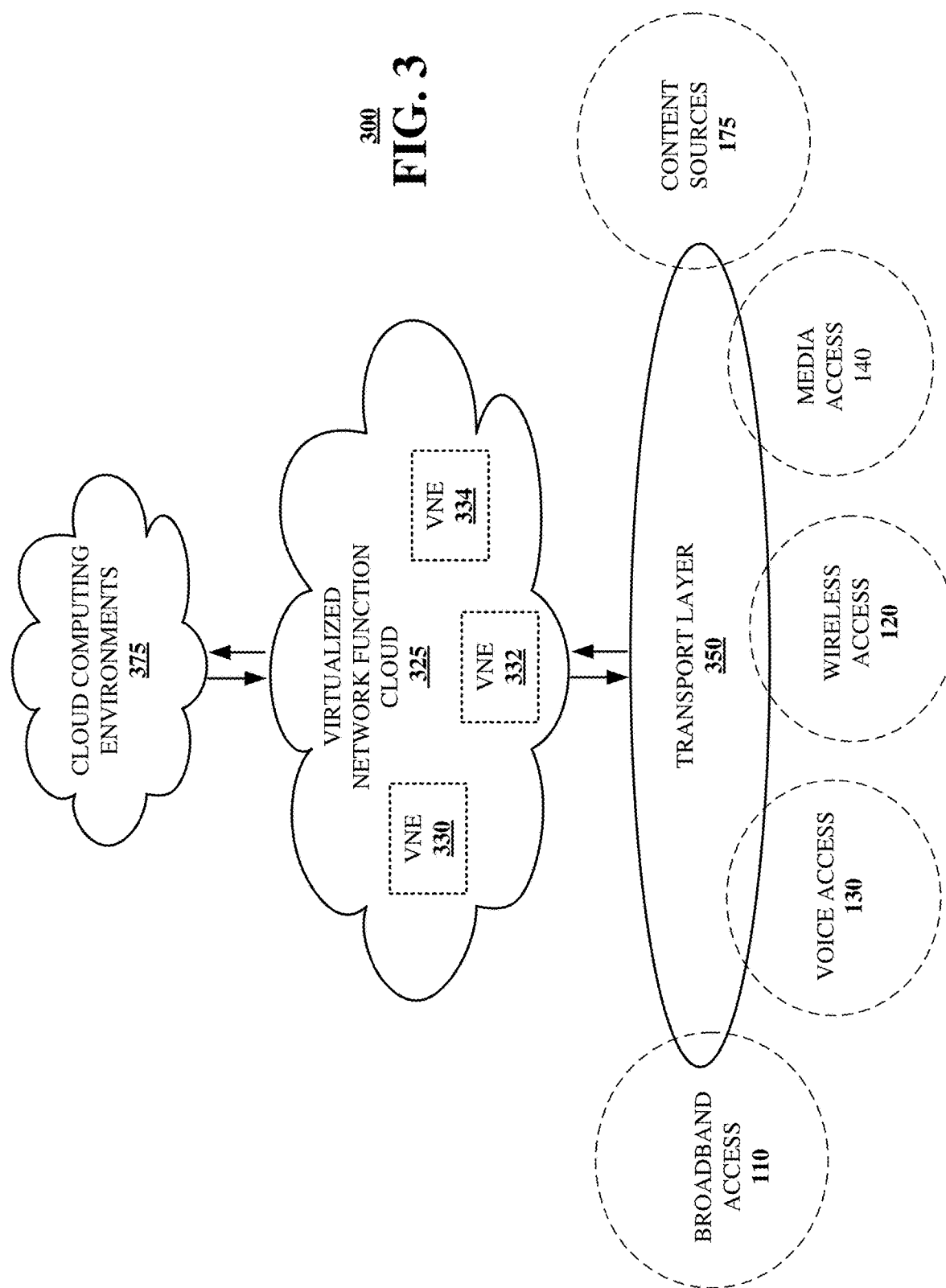

BIAS SCORING OF MACHINE LEARNING PROJECT DATA

CROSS-REFERENCE TO RELATED APPLICATION(S)

The present application claims priority to and is a continuation of U.S. application Ser. No. 18/172,654, filed Feb. 22, 2023, which is a divisional of U.S. application Ser. No. 16/704,965, filed Dec. 5, 2019, now U.S. Pat. No. 11,620, 542. All sections of the aforementioned application are incorporated herein by reference in their entirety.

FIELD OF THE DISCLOSURE

The subject disclosure relates to bias scoring of machine learning project data.

BACKGROUND

Machine learning processes can potentially introduce a degree of unintentional bias into data and models. The potential bias could go unrecognized and could go uncorrected.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
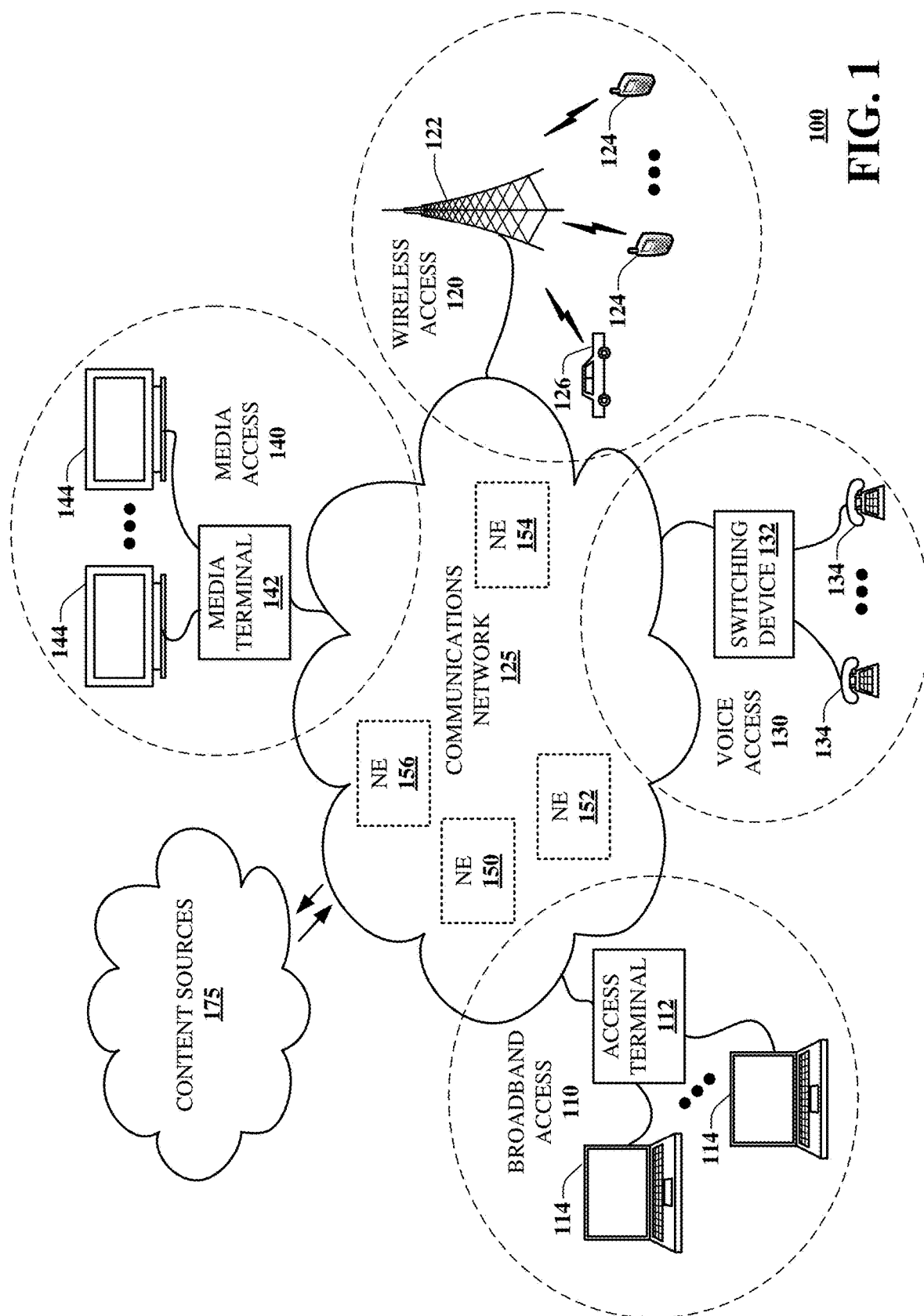
FIG. 1 is a block diagram illustrating an exemplary, non-limiting embodiment of a communications network in accordance with various aspects described herein.

The subject disclosure describes, among other things, illustrative embodiments for detecting and reducing potential bias or unfairness in machine learning systems. Other embodiments are described in the subject disclosure. It should be understood that, because the systems and methods in this disclosure are meant to address potential outcomes and mitigate possible risks, any reference to bias means "potential bias" and is not a conclusion of bias in the common or legal sense of the word.

One or more aspects of the subject disclosure may include a device including a processing system including a processor and a memory that stores executable instructions. The instructions, when executed by the processing system, facilitate performance of certain operations. The operations may include receiving, by the processing system, project data defining a proposed project of an entity and storing the project data in a project database with other project data for other projects. The operations may further include extracting features of the proposed project and, based on the extracted features, determining a clustering assignment for the proposed project. Determining the clustering assignment may comprise comparing information about the proposed project including the extracted features with information about the other projects and assigning the proposed project to a cluster including one or more projects having similar potential bias characteristics as the proposed project. The operations may further include determining a risk of bias for the proposed project and, based on the risk of bias, recommending a corrective action to reduce the risk of bias.

One or more aspects of the subject disclosure include a method that may comprise steps of receiving, by a processing system including a processor, proposed project data for a proposed project, wherein receiving proposed project data comprises receiving machine learning (ML) data, and wherein the proposed project is an ML project; and storing the proposed project data in a project database which stores other project data for a plurality of other projects, wherein the other projects are ML projects. The method may comprise steps of extracting features and metadata of the proposed project data and providing the features and metadata of the proposed project data to a clustering model, wherein the clustering model comprises an ML model. The method may comprise steps of receiving a clustering assignment for the proposed project from the clustering model and providing the clustering assignment and the features and the metadata of the proposed project to a potential bias scoring model, wherein the potential bias scoring model comprises an ML model. The method may comprise steps of receiving from the bias scoring model an indication of risk of potential bias for the proposed project and providing a recommendation for reducing any risk of potential bias for the proposed project. Providing the recommendation for reducing a risk of potential bias for the proposed project may include one or more of: providing a bias risk score, providing a list of bias factors affecting the bias risk score where respective bias factors on that list may be adjusted to reduce the risk of potential bias from those previously identified as having similar potential bias characteristic of the proposed project.

One or more aspects of the subject disclosure include a machine-readable medium storing executable instructions that, when executed by a processing system including a processor, facilitate performance of operations. The operations may include receiving project data defining a proposed project of an entity and storing the project data in a project database with other project data for other projects. The operations may further include extracting features of the proposed project from the project data, including extracting keywords from a textual project description of the proposed project, and retrieving metadata of the proposed project. The operations may further include determining a clustering assignment for the proposed project, including applying at least some of the extracted features and at least some of the metadata of the proposed project to a clustering model to identify a cluster of a plurality of clusters of projects, wherein the identified cluster includes projects similar to the proposed project. The operations may further include providing the clustering assignment and at least some of the extracted features and at least some of the metadata of the proposed project to a bias scoring model and receiving from the bias scoring model an indication of risk of potential bias for the proposed project. The operations may further include providing, based on the indication of potential bias, a recommendation for reducing the risk of potential bias for the proposed project. Providing a recommendation for reducing the risk of potential bias may include providing a bias risk score and providing a list of bias factors affecting the bias risk score. Respective bias factors of the list of bias factors may be adjusted to reduce the risk of potential bias for the proposed project.

In accordance with some aspects of this disclosure, given a database of machine learning projects, some embodiments permit creation of an ontology of potential biases based on the project descriptors for the projects. Bias may refer to an unintentional skew in population or a difference between expectation of a characteristic or population and a true value of the characteristic or population. An ontology may be a structure of concepts or entities within a domain, organized by relationships. Information about past and present projects is stored in a database. Information including textual descriptions of one or more projects is retrieved from the database. A keyword generating algorithm is then utilized on the project descriptions. The keyword generating algorithm extracts relevant and context-aware terms from the project descriptions. These extracted terms are coupled with other project metadata which are then used to cluster projects in the database into groups having similar potential bias characteristics. The potential bias ontology is then used to assign a bias-score to each of the clusters. When a new project is identified, one or more cluster memberships are assigned to the new project based on initial descriptions and related metadata. The cluster bias scores are then used to provide a potential bias score/categorization to the new project. As projects continue to be added to the database, the reliability and robustness of the clusters, as well as the ontology that generated them, improve owing to iterative training.

Referring now to FIG. 1, a block diagram is shown illustrating an example, non-limiting embodiment of a communications network 100 in accordance with various aspects described herein. For example, communications network 100 can facilitate in whole or in part in determining a potential risk for introduction of potential bias in a machine learning project, for example using machine learning models to cluster projects and score the machine learning project for potential bias. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
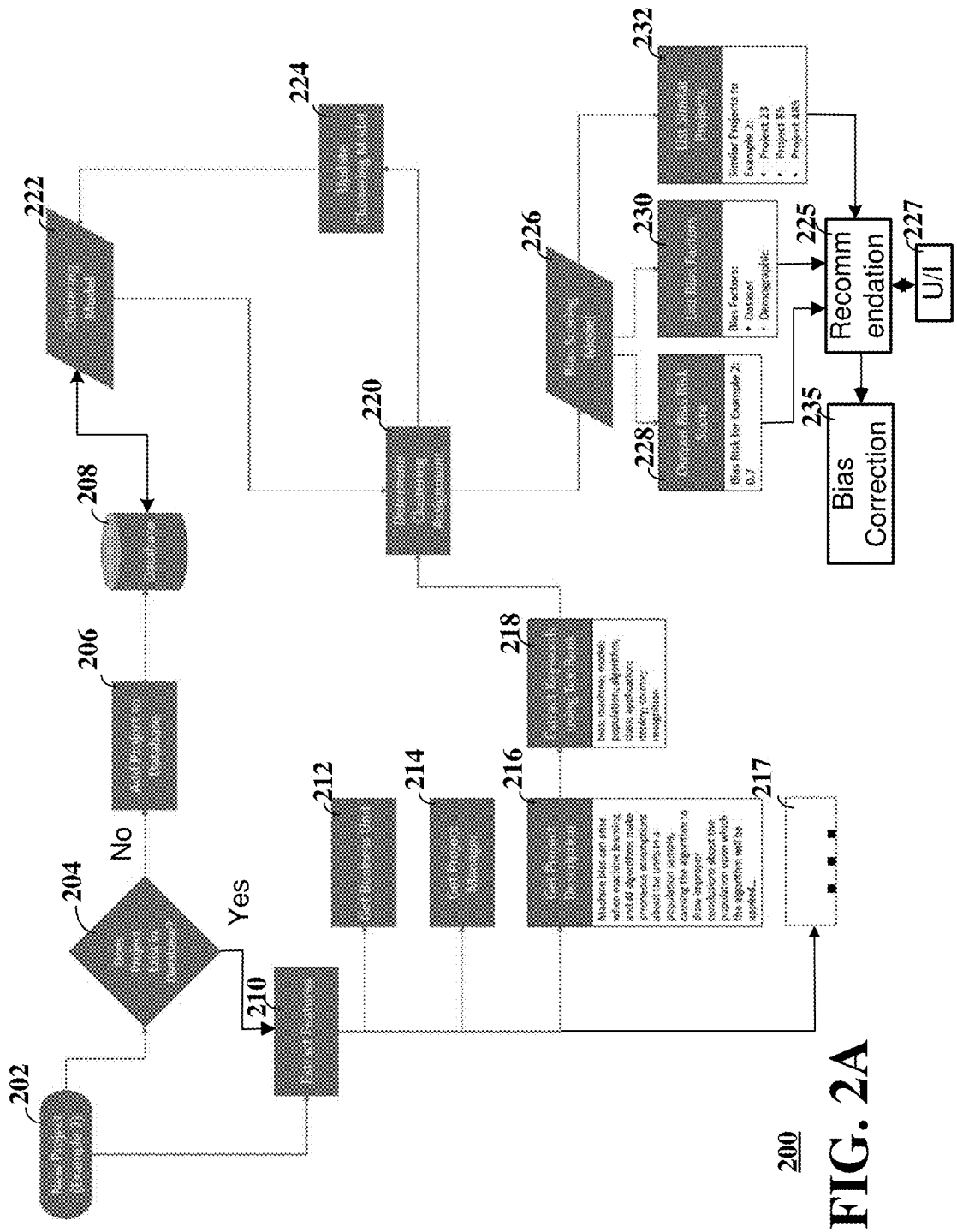
FIG. 2A is a block diagram illustrating an example, non-limiting embodiment of a system functioning within the communication network of FIG. 1 to detect and reduce potential machine learning bias in accordance with various aspects described herein.

FIG. 2A is a block diagram illustrating an example, non-limiting embodiment of a method 200 that may be implemented by or function within the communication network of FIG. 1 in accordance with various aspects described herein. The method 200 is one exemplary embodiment of a method or system for detecting and mitigating unintentional potential bias in a machine learning system.

In particular embodiments, aspects described herein may be implemented using machine learning. For example, certain inputs to a system or method comprise data about projects that may have been developed by machine learning. The data received as inputs may be further processed by machine learning systems to make decisions, draw inferences and provide recommendations. Broadly, machine learning is a set of tools and procedures of data analysis that automate analytical model building. Machine learning is an aspect of artificial intelligence. Machine learning makes use of the idea that automated systems, implemented on computing equipment, can learn from data, identify patterns and make decisions with minimal human intervention. The result is useful to humans for making decisions and implementing further processes and systems. Machine learning processes provide benefits of insight and inference that may be invisible to human review. But machine learning systems risk introducing or masking bias that is inadvertently and unknowingly present.

In the present context, bias may refer to an unintentional skew or variation in an actual population from what would be expected or intended for the population, or a difference between expectation of a characteristic of a population on the one hand, and a true value of the characteristic of a population. Different types of potential biases may be introduced into data or models for machine learning. For example, potential bias may be demographic in nature or geographic in nature. Potential bias may be behavioral or psychographic in nature. Other types of potential bias may exist as well. Potential bias may be tied to aspects of a product or service or a function. For example, a project to offer a new service may show potential bias by unintentionally being directed to or away from potential customers within certain demographic groups or geographic areas. The targeted audience may be skewed toward or away from potential customers having a particular characteristic. Typically, the potential bias is unintentionally introduced based on unrecognized or hidden factors. It should be understood that, because the systems and methods in this disclosure are meant to address potential outcomes and mitigate possible risks, any reference to bias means "potential bias" and is not a conclusion of bias in the common or legal sense of the word. Some research has been conducted on the detection and mitigation of potential bias within a machine learning model, starting from the data or the model itself or the output of the model. However, for an individual or a team working within an organization, there is no current way to determine if a project is at risk of exhibiting bias.

Potential bias may be related to demographic information, the nature of data being generated, processed and stored, or any item that could cause harm to an entity such as a business or an institution, products, a brand or a public reputation or perception. In an example, where a business is developing a new product or service, the business may use machine learning to predict which current and future customers should receive the new offering, if the result of the machine learning process causes the offering to include or omit, for example, certain demographic or geographic groups, that could be construed as potential bias. In another example, suppose an employer implemented a machine learning process that relied on natural language processing to automatically review received resumes from job seekers and tried to predict which job seekers should be contacted for in-person interviews. This may be done, in part, by automatically comparing incoming resumes with a seed data set of resumes from existing employees. However, any previous unintentional hiring bias that may be present in the existing workforce could potentially be automatically duplicated by the natural language process that matched the incoming resume characteristics to the existing workforce. In this way, potential bias could be introduced by the prediction because the machine learning program does not understand or recognize the historical context of the existing data.

From the perspective of the business, such potential bias is highly undesirable. Potential bias may cause the business to develop the wrong product or service, or market the new product or service to an unintended group. If the product or service is targeted to the unintended group, the group or market segment is less likely to adopt the product or process. Further, as noted, any potential bias may cause reputational harm to the business and may introduce legal and other risks. Accordingly, detecting, identifying, correcting and avoiding potential bias in any form is an important business and technical goal. Machine learning systems may be useful for achieving these goals; however, the subject disclosure contemplates systems that achieve such goals that may not be reliant on machine learning.

Current academic literature on potential bias detection and mitigation in machine learning (ML) processes focuses on where in the ML pipeline such potential bias may occur and developing algorithms to optimize a fairness metric. There is a significant challenge, however, for project managers and developers unfamiliar with this space in identifying which projects may pose a risk of potential bias at the outset. Even for ML experts, as a new project is commissioned, it might be challenging yet necessary to get a preliminary understanding of whether a development team needs to be careful about any potential bias issues. As noted, currently there are no solutions for predicting whether a project is susceptible to potential bias issues at the outset.

In some aspects, the present disclosure provides for using machine learning itself as a way of making predictions on which new projects are likely to face a potential bias problem. The system produces a numerical indication of risk of potential bias in an ML project. In some embodiments, recommendations for mitigating or eliminating the potential unintentional bias are provided. The disclosed embodiments allow detection of potential bias early in the ML pipeline to permit any detected potential bias to be mitigated.

Any entity or organization that deploys ML-based decision systems may have an internal database of plain-text, abstract-level descriptions of ML projects and systems. These abstracts may contain information on one or more of the following: a description of the project, intended use cases, information on data sources, the ML tools used, final results including successes and failures, and names of contributors to the project.

In accordance with various aspects described herein, a machine learning approach is presented to automate categorization of each project's potential for bias to improve opportunities for potential bias detection and appropriate interventions in the machine learning cycle. Potential bias may be categorized according to a range of risk, such as low risk for bias, medium risk for bias, and high risk for bias introduction. A numerical value may be determined, such as a number from 0.0 to 1.0 where 0.0 represents no risk of bias and the risk of bias in the project increases with the numerical value. In some aspects, features extracted from ML projects and the resulting bias categorization information are stored in a machine learning database (MLDB).

Further in accordance with various aspects described herein, given a database of machine learning projects including project descriptions, keywords are extracted from the project descriptions. One viable way to perform keyword extraction is the TextRank algorithm which can provide relevant and context-aware terms. An ontology of potential bias is built using available information, including project keywords, data sources, project contributors, end goals, etc. This ontology can be represented as a clustering framework including a set of clusters of related projects. Each cluster is assigned a bias score, indicating its propensity to exhibit potential bias. When a new project is processed, its keywords are extracted from the project description and coupled with its related metadata. These keywords and metadata may be referred to as the project's features. The project's features are fed through the bias-ontology to assign cluster memberships to the project. Based on the project's cluster memberships, a bias score/categorization (e.g., low risk for bias, medium risk for bias, or high risk for bias) is assigned to the project. Over time, as ML projects continue to be added to the database of projects, the bias-ontology or model is updated using the new projects and the bias scores assigned to each of the clusters are re-computed. This continuous learning keeps the system up to date.

In accordance with some embodiments, a system and method to detect, score and compensate for potential bias in projects may include some or all of the following. First, given a repository of project descriptions including abstracts, keywords and other metadata are extracted from those project descriptions. An example process for extracting keywords is a TextRank algorithm. Second, projects are clustered into related categories of projects. In some embodiments, an ontology of keywords and their co-occurrence, related to potential bias, as well as available information on data sources and project contributors, end goals, etc., may be used to cluster the projects. A risk of bias can then be inferred from each cluster. Third, a probability score that connotes a project's risk of bias is generated or determined from each cluster. The probability score corresponds to the probability that, in some aspect, the project reveals some potential bias based on comparison with other projects. A project's bias potential may be augmented with information on the project's data sources and contributors. Fourth, for a new incoming project, a cluster membership is assigned to the project based on its descriptions and a corresponding risk score is assigned. The new project may then be evaluated and modified according to the potential for bias. Recommendations for mitigation of potential bias may be provided.

The disclosed embodiments provide substantial benefits for an organization developing a number of projects over time. Information about past and present projects is collected and stored, including early versions of projects used for development or training, and incomplete projects that were started but not completed or fully implemented. Where some potential bias is identified or otherwise detected or determined, the existence of some potential bias may be used to detect, identify and eliminate potential bias from current and future projects to improve performance of the current and future projects and of the organization.

The disclosed embodiments provide substantial technical benefits and improvements over conventional technology. The project partitioning process, assigning projects to clusters, can be done offline, meaning that requirements for real-time computational and temporal efficiency are reduced. Embodiments of the system and method produce, as an output, a bias risk classification. This information comprises a probability rather than a binary value. Such information has an implicit confidence level across a spectrum of confidence, rather than just a binary, up-down indication. This provides a project manager with the ability and authority to set a particular threshold clearly identifying when concern over project bias is warranted. Ultimately, continuous improvement to the clustering algorithm, as each new project is analyzed and added to the model, is an inherent benefit as the database of project descriptions grows.

FIG. 2A depicts an illustrative embodiment of a method 200 in accordance with various aspects described herein. FIG. 2A illustrates exemplary steps of a process for implementing machine learning bias detection and classification. The method 200 may be implemented as described herein, using conventional or specialized data processing equipment, such as a data processing system including one or more processors, memory such as a database storing data and instructions for operation of the processing system. The instructions, when executed by the processing system, facilitate performance of operations including operations forming method 200 and other embodiments and variations. Generally, in some embodiments, the method 200 includes a feature extraction process 210, a clustering assignment process 220, a clustering model 222, an update clustering model process 224, a bias scoring model 226, a recommendation module 225 and a bias correction module 235.

In the particular illustrated embodiment, an input to the method 200 is a project 202, labelled Example 2 in FIG. 2A. The project 202 may be any suitable effort or initiative, undertaken on behalf of an entity or organization or department thereof, or a group of entities operating jointly, or by an individual. The project 202 may include inputs of its own such as market studies, collected data and other information, business plans, information about identified risks and possible rewards, targeted markets and market segments, prelaunch plans, post-launch plans, short-term plans, long-term plans, etc. The project 202 may be a new telecommunications service offering, or a new device to be developed and sold, as non-limiting examples. The nature of the project 202 will tend to dictate the information represented by the project 202. The project 202 in some embodiments is a new project or a proposed project to be analyzed for any potential bias that may be inadvertently introduced by the project 202.

The project 202 may be characterized or defined in any suitable way. In some embodiments, the project is characterized by a business unit associated with the project, a project manager responsible for the project and/or a textual description of the project. The business unit may be a department or a cost center or a geographical operating unit of a business, or any other identifiable organizational entity. The product manager may be an individual or a group of individuals with managerial responsibility for the project 202. In one example, the project 202 involves launching a new telecommunications, media, internet or advertising service, by a service provider, to a market segment of customers, some of whom are existing customers of the service provider and some of whom will be new customers of the service provider for the new service. However, the project can be associated with other services, products or tasks, which may or may not be associated with telecommunications. In other examples, the offering could be a modified version of an existing service or an improvement to an existing service, such as a service or product offered in a different language or a different format or through a different delivery channel (such as via broadcast or cable television in addition to via broadband networks).

At block 204, the method determines if the project 202 currently exists in a project database. The project 202 in this embodiment is characterized by a variety of data stored in various sources. The data may take any format and represent any relevant information. In one example, the data includes a high-level textual description of the exemplary telecommunication service offering, along with business goals and input parameters.

At block 206, if the project 202 is not currently existent in the project database, the project is added to project database 208. Project database 208 in some embodiments stores data for a wide range of projects. The stored projects may include projects previously undertaken by the business implementing the method and for which there is historical data. The stored projects may include projects started but not actually implemented or early versions of projects that were started and subsequently revised. The stored projects may include projects that originated outside the business and for which data is available for subsequent use and processing. At least some of the projects may show or otherwise be determined to show some evidence or characteristics of potential bias and may be labelled as such. In some cases, none of the projects may have exhibited any potential bias and are thus not labelled. Even if bias is not found in a project, benefits may be provided to the business implementing the method. One of the most valuable things for a manager of a new project is to learn that the project does not have bias concerns. The manager and team can then go about building and deploying the project. The data of the project 202 is added to the database 208. Any useful data formatting, abstraction, indexing or other processes may be performed at this time to facilitate subsequent processing of the data forming the project 202.

If the project 202 exists in the database 208, or after the project has been added to the database 208, a bias identification process is initiated for the project. Initially, a feature extraction process 210 operates to identify and extract features of the project 202 stored in the database 208. Any suitable or available features may be identified and extracted. Examples in some embodiments include identifying, step 212, the business unit associated with the project 202; identifying the project manager, step 214, responsible for the project 202; identifying, step 216, a description of the project 202, or a title of the project 202, or metadata for the project 202. As indicated by step 217, other features and information may be extracted by the feature extraction process 210 as well. For example, other project data that may be identified and extracted include project team member identification, project use cases, and datasets being used by machine learning projects, and machine learning models being used, etc. Any data associated with a project can be used to feed the clustering model 222.

The project description can vary in length for different projects. To process the project description, step 216 may use natural language processing techniques. In some embodiments, step 218 implements keyword extraction. One example of a suitable algorithm for extracting keywords or key phrases is referred to as TextRank. Another suitable keyword extraction algorithm is term frequency-inverse document frequency (TF-IDF). In an example, TF-IDF generates weighting factors based on an analysis of each individual word within each project description, and how frequently each word occurs within each project description as well as word frequency across all project descriptions in the project database 208.

Other examples of keyword or key phrase extraction may be readily imagined. Any other suitable algorithm, process or tool may be used. Once keywords are extracted, other less relevant words are filtered out. The result may be provided to a clustering assignment process 220.

Referring to the clustering model 222, in some embodiments, the clustering model 222 is trained offline using contents of the project database 208. The clustering assignment process 220 receives information about the project description including extracted keywords and project metadata and provides the received information to the clustering model 222 via an update clustering model process 224. The clustering assignment process 220 determines from the output of the clustering model 222 which cluster the new project 202 belongs to. Subsequently, the update clustering model process 224 is performed, creating a feedback loop so that the process always has the most relevant and up-to-date model.

Further, the result of the clustering assignment process 220 is passed to a bias scoring model 226. The bias scoring model 226 may also be trained offline. The bias scoring model 226 takes into account the clustering assignment received from clustering assignment process 220 as well as some additional features of the new project. The bias scoring model 226 provides as output information an output bias risk score 228, a list of bias factors 230 and a list of similar projects 232.

In some embodiments, one or more outputs of the bias scoring model, including the bias risk score 228, the list of bias factors 230 and the list of similar projects 232, are provided to a recommendation module 225. In some embodiments, the recommendation module 225 may also receive the extracted features of the new project 202 produced by the feature extraction process 210 and the output of the clustering assignment process 220. The recommendation module 225 operates to provide a recommendation to reduce or eliminate the potential bias determined by the method 200, if any. The recommendation produced by the recommendation module 225 may be based on any available information, including the bias risk score 228, the list of bias factors 230, the list of similar projects 232, the extracted features, etc.

The nature of the recommendation provided by the recommendation module 225 may be of any form suitable for the project 202. For example, the recommendation module 225 may compare the bias risk score 228 with a predetermined threshold and produce a recommendation based on the comparison. Further, the recommendation module 225 may make recommendations based on a comparison with a threshold, plus other information about the proposed project 202. For example, if the nature of the proposed project 202 is a new telecommunication service offering to a targeted geographical area, if the bias risk score 228 exceeds a predetermined geographic threshold, the recommendation module 225 may recommend changing geographical parameters of the telecommunication service offering. Similarly, if the bias score exceeds a predetermined income threshold for income ranges of likely purchasers of the new service, the recommendation module may recommend changing income related features of the telecommunication service offering. Other extensions and variations may be readily made. In other examples, recommendations might include changing a geographic distribution for an advertising campaign for the proposed new project or changing a targeted age range for customers for the proposed project.

Further, the recommendation may include one or more factors of the list of bias factors 230 to review and adjust in order to eliminate or reduce the risk of potential bias for the proposed new project. Further, the recommendation may include a recommendation to review projects on the list of similar projects 232 to analyze if such projects included previously undetected bias. The recommendation module 225 may include a dashboard or some other user interface 227 for interaction by a human for providing the recommendation and receiving input from the human, or for receiving a selection instruction about a correction to make to project data for the project 202. For example, the user interface may provide the one or more outputs of the bias scoring model to a human for review and consideration. The human may decide to adjust some aspect of project data as a way to mitigate or reduce potential bias detected by the method 200.

In some embodiments, information about the recommendation may be provided to the bias correction module 235. The bias correction module 235 may operate to modify one or more aspects of the project 202 based on the recommendation. For example, if the recommendation involves changing the targeted age range for customers of the project, the bias correction module 235 may implement that change in the data for the project stored in the project database 208. The method 200 may then be repeated, automatically or with human intervention, based on the corrections produced by the bias correction module 235.

The bias risk score 228 represents a quantification of the risk that the new project 202 has a potential undesirable bias. The entity operating the method can determine the relative importance of the value that is produced. The list of bias factors 230 represents factors that influenced the bias risk score 228. The list of similar projects 232 helps a user identify projects that are statistically similar to the new project 202. This information can provide context for understanding the results from the bias scoring model 226, such as how this project relates to the others and what kinds of potential bias are present in other projects, etc. In addition, this helps the user identify projects in the past that may have been similar and thereby reduces the repetitive nature of work. Solutions adapted for the earlier, similar project may be adopted or adapted for the current new project. The list of similar projects 232 may serve as identification of projects that may be useful in identifying and addressing potential bias in the present new project 202.

FIG. 2A illustrates an example. In step 216, a description of a project is accessed and the process retrieves exemplary text. The text may be an abstract of the project: "Machine bias can arise when machine learning and AI algorithms make erroneous assumptions about the units in a population sample, causing the algorithm to draw improper conclusions about the population upon which the algorithm will be applied." Application of the keyword extraction algorithm, step 218, provides example keywords as follows for this example: bias; machine; model; population; algorithm; class; application; deploy; source; recognition. After determining a clustering assignment by the clustering assignment process 220, and applying the extracted keywords to the clustering model 222 and determining which cluster the new project 202 belongs to, project information is provided to the bias scoring model 226. For this example, the bias scoring model 226 determines an output bias risk score of 0.7, a list of bias factors 230 including the data set used and the demographic of the sample. Finally, the bias scoring model 226 provides a list of three similar projects 232 that may be consulted, identified as Project 23, Project 85 and Project 485.

Figure 2B:
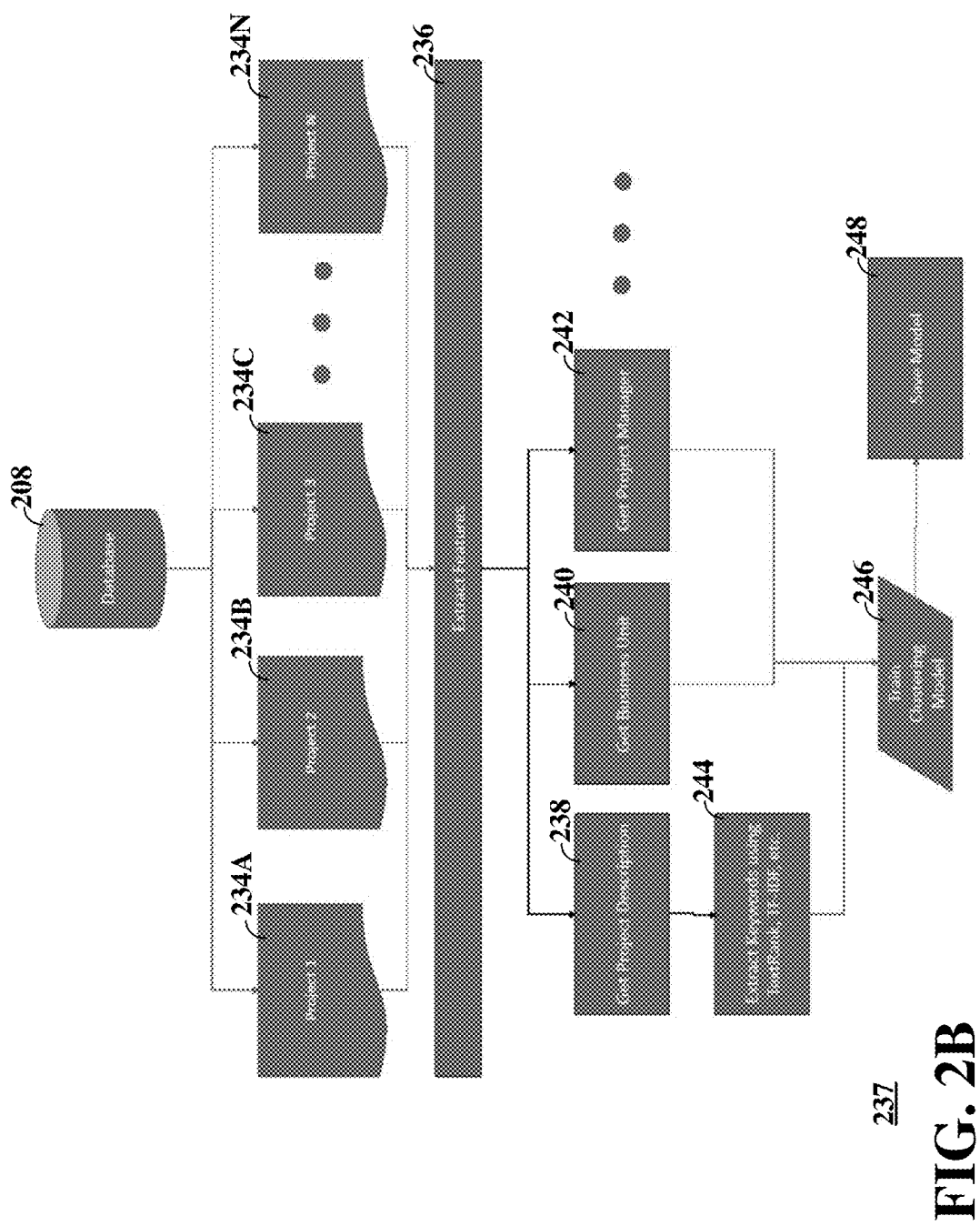
FIG. 2B depicts an illustrative embodiment of a method in accordance with various aspects described herein.

FIG. 2B depicts an illustrative embodiment of method 237 for training and saving the clustering model 222 in accordance with various aspects described herein. The clustering model 222 operates in conjunction with the project database 208 and method 237 includes a feature extraction operation 236, a cluster model training operation 246 and a save model operation 248. The project database 208, as discussed in conjunction with FIG. 2A, stores information about past and current projects, illustrated in FIG. 2B as project 1 234A, project 2 234B, project 3 234C through project N 234N. Any number of projects may be stored in the project database 208 and it is expected that the number of projects will increase over time as further projects are evaluated.

Projects stored in the project database 208 may be actively gathered or collected from different sources. For example, a project may include a website, either internal to the entity or company, or a publicly available website. The website might include a textual description of the project or graphics or audio or video files that form the project. The website in some embodiments may include a list of project personnel including one or more project managers. The website may include project timelines and review materials. The website may include one or more publications such as white papers with details about one or more aspects of the project. Further, a website is just one example of a resource available on a network, either a public or private network. Instead of or in addition to a website, the entity may use collaboration tools such as GoToMeeting® or Slack® which gather and store information produced by project contributors. The information may be collected in any suitable manner, such as by crawling one or more networks to locate and retrieve the information. Any such information, however formatted, may be collected as a project stored in the project database 208.

The feature extraction operation 236 operates to retrieve projects from the project database 208 and extract features from each project. In an embodiment, each respective project, project 1 234A, project 2 234B, project 3 234C through project N 234N are individually retrieved from the project database 208 and evaluated. The feature extraction operation 236 in some embodiments includes a get project description operation 238, a get business unit operation 240, and a get project manager operation 242.

The get project description operation 238 operates to retrieve from a project such as project 1 234A a textual description of the project. The get project description operation 238 may employ a keyword extraction function 244 to extract features from the textual description of the project. For example, a standard keyword extraction function such as TextRank or TF-IDF may be used. Alternatively, in other embodiments, other keyword extractors may be used, or other processes may be used to identify the focus or key points of the project as expressed in the textual description.

The get business unit operation 240 operates to retrieve and identify a business unit associated with a project in the project database 208. The business unit may be a department or cost center or operating function or group within an entity. The get project manager operation 242 operates to retrieve and identify a project manager associated with a project in the project database 208. The project manager may be identified as one or more persons involved with supervising and managing the planning and progress of the retrieved project.

Other operations may be included as well. Functions such as the get project description operation 238, the get business unit operation 240, the get project manager operation 242 and others operate to provide information about what past or current projects in the project database 208 may be similar to or related to a current project of interest. For example, if a current project is being developed within the same business unit that developed an earlier project such as project 1 234A, there may be useful similarities that justify further consideration of project 1 234A. Similarly, if a current project is being developed under the same project manager that developed an earlier project such as project 2 234B, there may be useful similarities that justify further consideration of project 2 234B.

The feature extraction operation 236 operates to identify and retain information that is most relevant to the project. This may include deleting irrelevant data, organizing data into one or more standard formats, and extracting information, such as keywords, from the data of the project. If any data is in the form of text, a natural language processing (NLP) function such as the keyword extraction function 244 may be used to identify important concepts and features of the project.

The cluster model training operation 246 uses the information extracted from the various projects to train the clustering model 222 in FIG. 2A. Model training may be performed in any suitable fashion. Generally, the information extracted from the various projects forms training data for training the clustering model 222. The cluster model training operation 246 implements a learning algorithm that finds patterns in the training data that map input data attributes to a target, identify an answer to be predicted, and generate as outputs an update to the clustering model 222 that captures these patterns. Once the clustering model 222 is trained, the save model operation 248 saves the clustering model 222 in a suitable location.

As indicated above in conjunction with FIG. 2A, the saved clustering model 222 can be used to evaluate new projects such as the new project 202. Moreover, as each new project is evaluated, the clustering model 222 is updated when the update clustering model process 224 is performed. This ensures that the clustering model 222 is always using the latest version of the dataset forming the clustering model 222. When a new project is received, features are extracted and provided to the clustering model 222. An output from the clustering model 222 is an indication of what cluster the new project should belong to, based on the existing trained clustering model 222. The clustering model implements one or more distance metrics to develop a conclusion about where to assign newly processed projects. As the clustering model 222 is updated, previous clustering assignments for previous projects may be changed based on the updated model. Moreover, new clusters may be identified or designated, and previously processed clusters can be moved to a new cluster. Clusters are thus automatically learned and re-learned from the on-going processing of new projects such as new project 202.

The list of similar projects 232 produced by the bias scoring model 226 thus provides a substantial technical benefit of improving accuracy on an on-going basis. A new project comes in and based on the foregoing embodiments illustrated by FIG. 2A may show the existence of a potential bias based on a comparison to a bias threshold. Alternatively, the bias scoring model 226 can provide a raw bias score for the new project that can be compared to bias scores of other similar projects enabling users to make their own determination as to whether bias is present. In either embodiment, the list of similar projects 232 can serve as a reference to detect a potential for bias in the new project.

The learning process represented by the feedback loop including the update clustering model process 224 provides substantial technical benefits. It improves the accuracy and reliability of the clustering model 222. Consequently, when new projects get added to the project database 208, the ability to detect potential bias increases in accuracy and reliability.

Figure 2C:
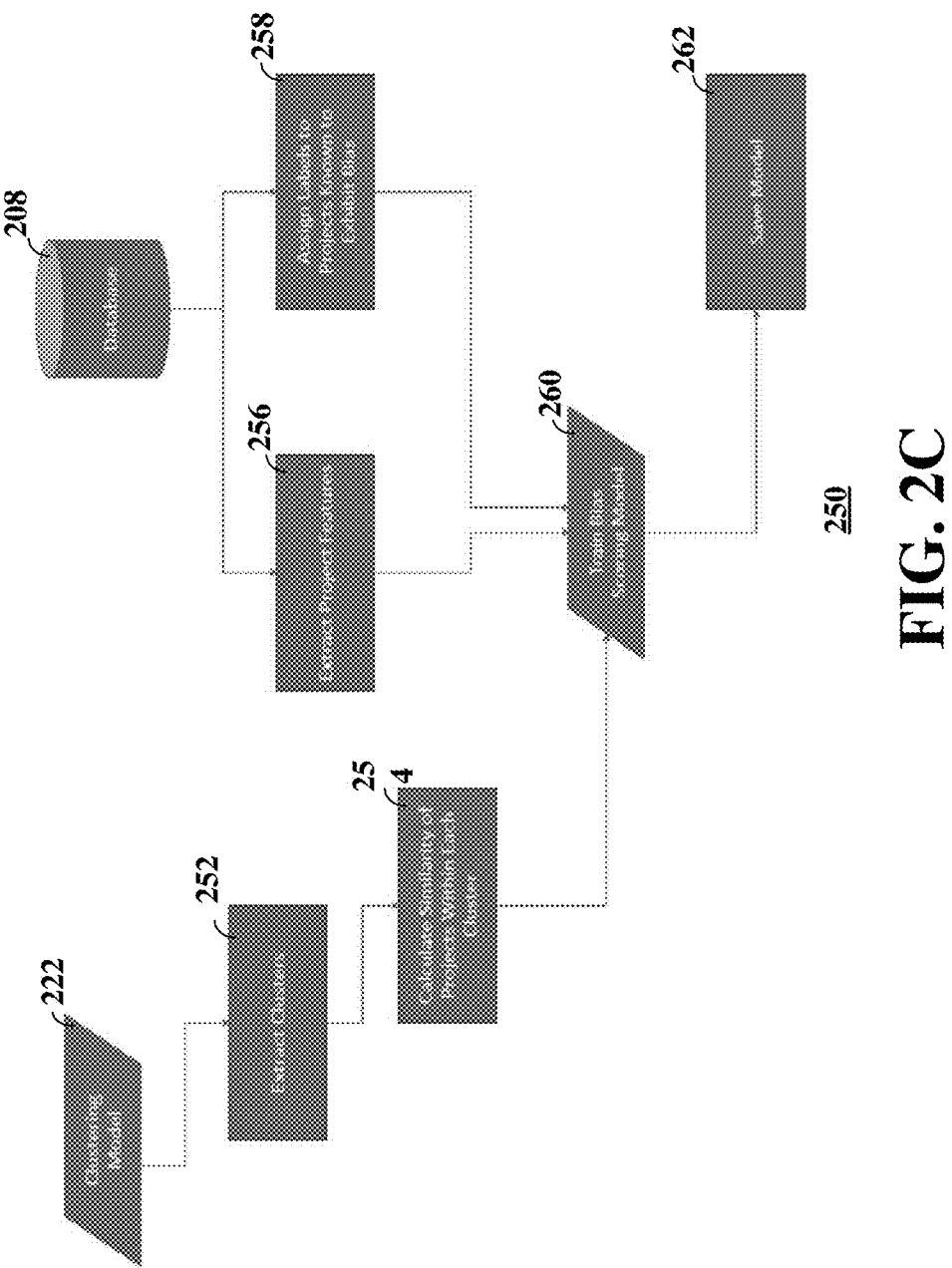
FIG. 2C depicts an illustrative embodiment of a method in accordance with various aspects described herein.

FIG. 2C depicts an illustrative embodiment of a method 250 in accordance with various aspects described herein. In particular, FIG. 2C illustrates a method for training and saving the scoring model 226 of FIG. 2A. The method 250 begins with the trained clustering model 222 and the project database 208 of projects. The method 250 includes a cluster extraction operation 252, a similarity calculation operation 254, a project feature extraction operation 256, a labelling operation 258, bias scoring model training operation 260 to train the bias scoring model 226, shown in FIG. 2A, and to train the results via a save model operation 262. More, different or fewer operations may be included in alternative embodiments. Initially, the bias scoring model 226, FIG. 2A, can be trained, and, in some instances, this includes manual steps performed via human intervention or initialization.

As noted earlier, clustering model 222 is trained to identify that a project belongs to one or more clusters. The definition and contents of the clusters are repeatedly updated as new projects are evaluated. At the cluster extraction operation 252, the trained clusters are extracted from the clustering model 222. Initially, all clusters are extracted from the clustering model 222.

In an exemplary embodiment, the similarity calculation operation 254 calculates the similarity of each project within each cluster supplied by the clustering model 222. For example, if there are five clusters in the clustering model 222, the similarity calculation operation 254 first looks at all projects within a first cluster and determines how similar all projects in the first cluster are to each other. Then, the similarity calculation operation 254 next looks at all projects within a second cluster and determines how similar all projects in the second cluster are to each other. This continues for all clusters in the cluster model, up through the fifth cluster in this example.

Similarity among projects may be determined in any suitable manner. One example is cosine similarity in which each project is treated as a vector through an appropriate embedding. Similarity between projects is determined by an angle between vectors of corresponding projects. The smaller the angle, the more similar the projects are. Other techniques for similarity determination may be readily substituted.

The project database 208 stores information about all projects. The project feature extraction operation 256 operates to extract all features of a project, as discussed earlier. Other feature extraction processes may be used as well.

Further, the labelling operation 258 operates to assign labels to projects in the database that are believed or determined to have a risk of potential bias therein. For the initial training for the bias scoring model 226, there must be information about projects that are known to exhibit a risk of bias. For example, all projects in the database 208 may be reviewed and assigned a descriptor or value, which can indicate if the project exhibits bias or a risk of bias, or if the project does not exhibit potential bias or a risk of bias. In some embodiments, this initial labelling operation is done by a human. In some applications, an automated process may be substituted.

The bias scoring model training operation 260 receives from the similarity calculation operation 254 information about project similarity and project cluster assignments, the extracted project features from the project feature extraction operation 256 and the project labels from the labelling operation 258. This information is used by the bias scoring model training operation 260 to train a new bias scoring model 226. The new bias scoring model 226 is saved by the model saving operation 262 and may be saved in any convenient location using any suitable format. As noted earlier, the bias scoring model 226 is a machine learning model useful for detecting potential bias in new projects based on experience with earlier projects. The bias scoring model 226 is automatically updated as each new project is processed. That is, as the bias scoring model 226 determines that a new project exhibited bias, or did not exhibit bias, that result is fed back into the model to improve the accuracy and reliability of the bias scoring model 226. Example models that may be adapted to form the bias scoring model 226 include logistical regression models or random forest models or a deep learning approach. Selection of a model may depend on factors such as the nature of the dataset, the size of the dataset and desired output of the model.

Figure 2D:
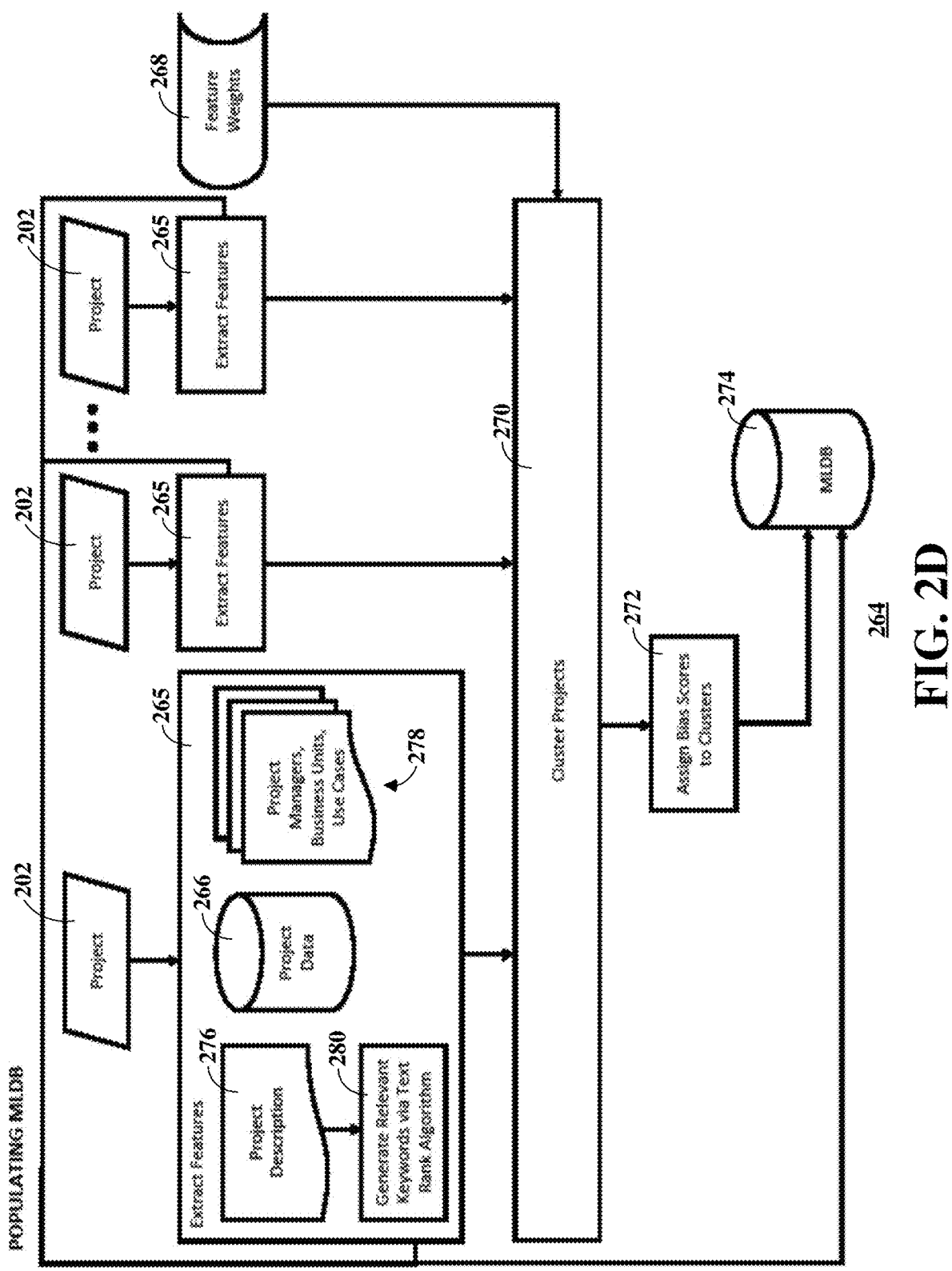
FIG. 2D depicts an illustrative embodiment of a system in accordance with various aspects described herein.

FIG. 2D depicts an illustrative embodiment of a method 264 in accordance with various aspects described herein. The embodiment of FIG. 2D can be used in place of, or in conjunction with, the steps of the embodiment of FIG. 2A for identifying potential bias in a project using information about previous projects. In particular, method 264 illustrates an embodiment of a method for populating a machine learning (ML) database (MLDB) 274 in a system for identifying potential bias in a project.

The method 264 for populating the machine learning database MLDB 274 includes a step 265 of extracting features from one or more projects 202, a step 268 of applying feature weights, a step 270 of clustering the projects and a step 272 of assigning bias scores to clusters. Information about projects is added to the machine learning database MLDB 274.

The projects 202 generally contain data and other information about past or current projects of an entity, business organization, department or otherwise. The projects 202 may be completed projects, projects that are now under development, projects that have been completed. The projects 202 may originate within an entity or organization or may originate external to the organization. At least some of the projects 202 may illustrate some potential bias, its operation or its results. Each project 202 may have project information for the project 202 stored in a location such as a project database 266.

A project 202 may be defined to include a network location defined by a website or uniform resource locator and be either internal or external to the entity or company. In this example, the website in some embodiments includes information for the project 202 such as a textual description of the project 202, graphics or audio or video files, or other data that form the project 202. The website might include additional information such as a list of project personnel including one or more project managers. Project information for the project 202 may include project timelines and review materials. Project information for the project 202 may include copies or drafts of one or more publications such as white papers with details about one or more aspects of the project. Further, a website is just one example of a resource available on a network that is either a public or private network. Instead of or in addition to a website, the entity may use collaborations tools for team members. The collaboration tools may gather and store information produced by project contributors. The project information may be collected in any suitable manner, such as by crawling one or more networks to locate and retrieve the project information. Any such information, however formatted, may be collected as a project stored in the project database 266.

The step 265 of extracting features from a project 202 may include accessing project data stored in the project database 266 and any other available sources of project information. The step 265 of extracting features from the project 202 may include extracting any information or data that may be useful for determining the presence or potential for bias in the project 202. For example, in some embodiments, the step 265 of extracting features from a project 202 may include extracting a project description 276 and extracting project metadata 278 for the project 202.

The project description 276 may be a textual description of the project 202. In some embodiments, the project description 276 may be at a high level, including just a few descriptive sentences. In other embodiments, the description 276 may include detailed information about the project 202.

One embodiment of step 265 of extracting features from a project 202 may include a step 280 of extracting or generating keywords from the project description 276. Extracting keywords from short texts can be achieved via co-occurrence models. These models not only consider the individual words that are present in the text, but also examine how likely two words are to appear together. This provides necessary context and weight to relevant words. One such co-occurrence model is TextRank, which is based on the PageRank algorithm of Google®. With TextRank, a window is defined in which to examine co-occurring words. Words are denoted as nodes and an undirected edge is defined as a link between two nodes in the window. The TextRank algorithm seeks to learn the weights of the edges between nodes. These weights provide information about the strength of the co-occurrence. The edges with the largest weights correspond to the nodes that are most important, which can serve to identify the keywords of the text.

To illustrate the effectiveness of TextRank, the following are a few examples where keywords are generated using this algorithm. In a first example, a project abstract states as follows: "To support the company's new advertising division, our team is developing checks that could help to ensure that the targeted audience for an advertising campaign is not accidently biased towards certain protected or sensitive groups of consumers. This approach focuses on using possible disparate impact to measure potential improper discrimination in targeted advertising, and proposes an approach based on machine learning techniques that allow us to infer the relevant audience for a campaign from an initial targeted list provided by an advertiser. The inferred relevant audience can then be used to test for potential bias across different consumer groups. Our methods can also be used to expand the targeted audience in a way that will help mitigate any detected potential bias. These proactive steps support the company's long-term commitment to the responsible use of customer information as well as maintaining a brand-safe environment for our advertising clients."

Keywords detected for this passage include the following: advertise; audience; bias; target; consumer; infer; group; campaign; support; inform.

In a second example, a Project Abstract states as follows: "Machine bias can arise when machine learning and AI algorithms make erroneous assumptions about the units in a population sample, causing the algorithm to draw improper conclusions about the population upon which the algorithm will be applied. These types of errors could lead to the deployment of highly accurate models that are perceived to be unfair to segments of the target population. There have been a number of high-profile examples in which model-based technologies such as image captioning, speech recognition, and facial recognition report differential performance for members of the majority and minority classes when studied across racial/ethnic groups, genders, and other protected classes. In this talk, I will provide a working definition of machine bias and explain why it is important for data scientists to take it into consideration when building and deploying models. I will identify several key sources of machine bias and propose methods that could be applied to mitigate them. Finally, I will highlight a few open source tools that could be potentially helpful in bias detection and correction."

Keywords detected for this passage include the following: bias; machine; model; population; algorithm; class; application; deploy; source; recognition.

In a third example, a Project Abstract states as follows: "Networks, also known as graphs, are one of the most crucial data structures in our increasingly intertwined world. Social friendship networks, the world-wide web, financial systems, infrastructure (power grid, streets), etc. are all network structures. Knowing how to analyze the underlying network topology of interconnected systems can provide an invaluable skill in anyone's toolbox. This presentation will provide a hands-on guide on how to approach a network analysis project from scratch and end-to-end: how to generate, manipulate, analyze and visualize graph structures that will help you gain insight about relationships between elements in your data."

Keywords detected for this passage include the following: network; structure; provide; analyze; system; world; graph; datum.

Other examples of keyword detection may be readily imagined. Any other suitable algorithm, process or tool may be used to perform keyword detection. Once keywords are extracted, other less relevant words are filtered out. The result may be provided to a clustering assignment process.

In addition to project descriptions, projects such as project 202 may also have metadata such as metadata 278 associated with them. Such metadata 278 may include, for example, datasets used, contributors, end goals, business units, project personnel, etc. This metadata 278 may be grouped with the keywords that are extracted from the project descriptions 276 as part of the step 280 of extracting or generating keywords from the project description 276. Such a grouping creates a feature representation for the project 202.

As noted above, a plurality of projects 202 is processed to extract feature data in step 265 from the projects 202. Repeating these processes of keyword extraction, step 280, and mining of metadata, step 278 for many projects 202 will give feature representations for a diverse set of ML projects 202. Some embodiments also introduce a step 268 of applying feature weights to one or more of the projects 202. Applying feature weights in step 268 creates a weighting scheme that gives relative importance to risk factors believed to have more influence on bias. Examples include existence of project keywords that may carry more weight than association with certain business organizations. Selecting and applying feature weights may be done on any suitable basis including experience with the types of project information and types of potential bias previously detected.

Once features have been extracted from the projects 202 at step 265, a step 270 of clustering the projects can be performed based on the extracted features and taking into consideration the feature weights. Projects which contain a potential for bias will have a shared set of features and will be clustered in similar groups.

Finally, in a step 272 of assigning bias scores to clusters, each cluster is assigned a preliminary bias score. The clusters with their respective bias scores define an ontology of bias or clustering model. The clustering model may be stored in the database MLDB 274. The database MLDB 274 is thus initialized or built based on pre-existing projects 202 and information about those projects.

Subsequently, when a new project is added to the database MLDB 274, its keywords and metadata may be extracted to create a feature representation. Features of the new project are then fed through the ontology to determine which clusters the new project belongs to. An overall bias score is determined for the new project and a categorization is assigned, such as low, medium, or high, on the potential for bias in the new project.

As new projects are added to the database MLDB 274, not only are their respective bias scores and categorizations determined, but the bias-ontology itself may also be retrained in order to update the bias score for each cluster. This produces a continuous learning mechanism so that the bias-ontology adapts to changing projects, terminology, data, and other risk factors. The retraining and project scoring can be computed offline. This provides flexibility to assess which risk factors will continue to be used and what feature weighting scheme will be employed, such as in step 268. Factors that influence potential bias may change over time and maintaining the offline nature of building the ontology allows for careful consideration of potential risk factors so as not to skew the clustering. Thus, a substantial technological improvement is provided in that the bias-ontology is updated on an on-going basis to ensure accurate clustering and bias score determination.

Populating the machine learning database MLDB 274, creation of the bias-ontology, and continuous learning are all performed offline. Therefore, computational and temporal efficiency are not an issue. The output of a bias categorization system such as described by method 264 illustrated in FIG. 2D provides the project manager with the authority to assess their own risk tolerance of when concern is warranted.

The foregoing systems and methods as illustrated by FIGS. 2A-2D facilitate identification of a potential bias in a project as early as possible in the machine learning lifecycle of a new project. Also, the system helps to identify other projects, that may or may not be related to a new project, that exhibit similar or related bias.

While for purposes of simplicity of explanation, the respective processes are shown and described as a series of blocks in FIGS. 2A-2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram of a communication network 300 is shown illustrating an example, non-limiting embodiment of a virtualized communication network 300 in accordance with various aspects described herein. In particular the virtualized communication network 300 can be used to implement some or all of the subsystems and functions of communication network 100, the subsystems and functions of method 200, method 237, method 250 and method 264 presented in FIGS. 1, 2A, 2B, 2C, and 3. For example, virtualized communication network 300 can facilitate in whole or in part determining a potential risk for introduction of potential bias in a machine learning project, using machine learning models that cluster projects and score the machine learning projects for potential bias.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic, so that the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
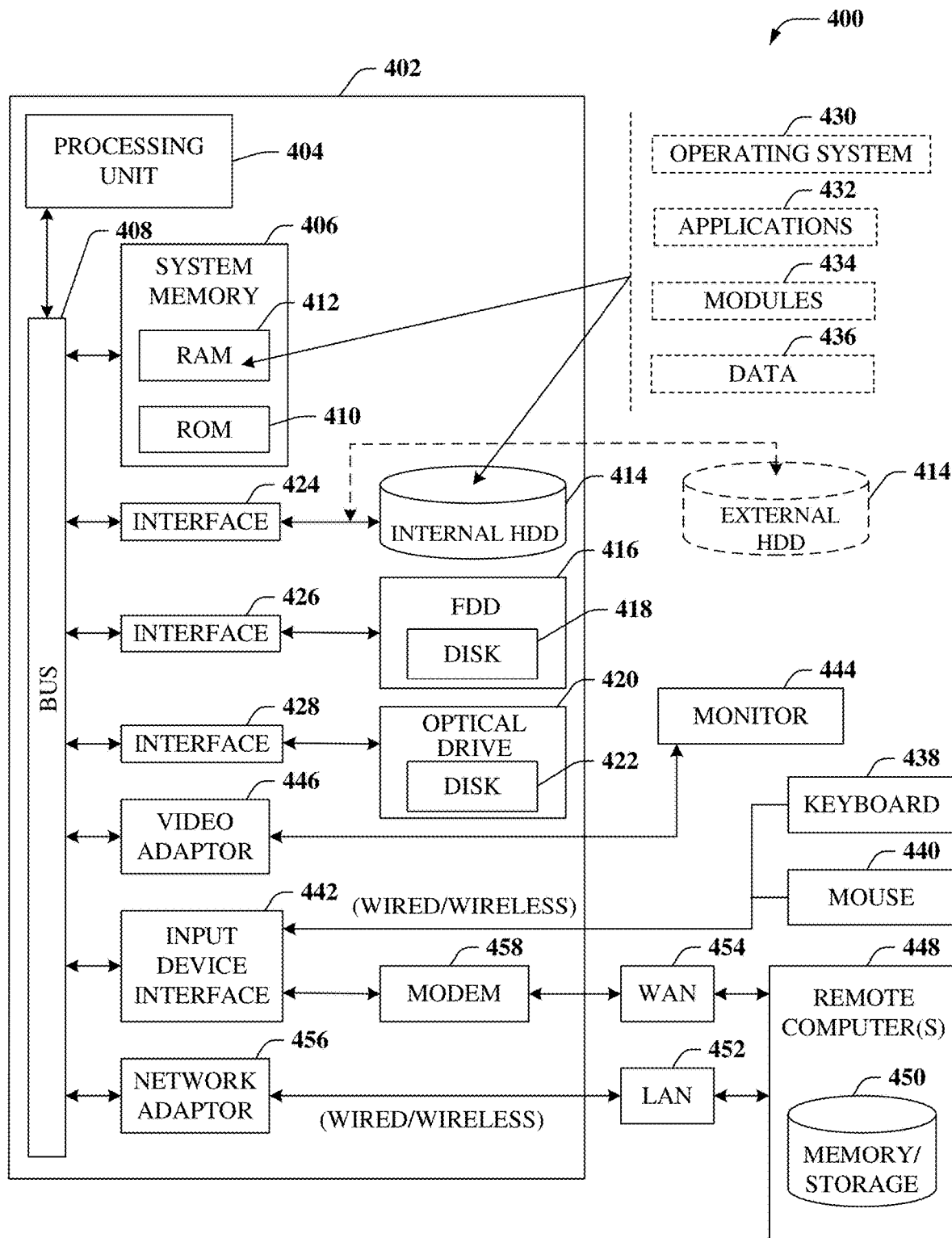
FIG. 4 is a block diagram of an example, non-limiting embodiment of a computing environment in accordance with various aspects described herein.

Turning now to FIG. 4, there is illustrated a block diagram of a computing environment 400 in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining a potential risk for introduction of potential bias in a machine learning project, using machine learning models to cluster projects and score the machine learning projects for potential bias.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system 430, application programs 432, program modules 434, and/or program data 436 can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
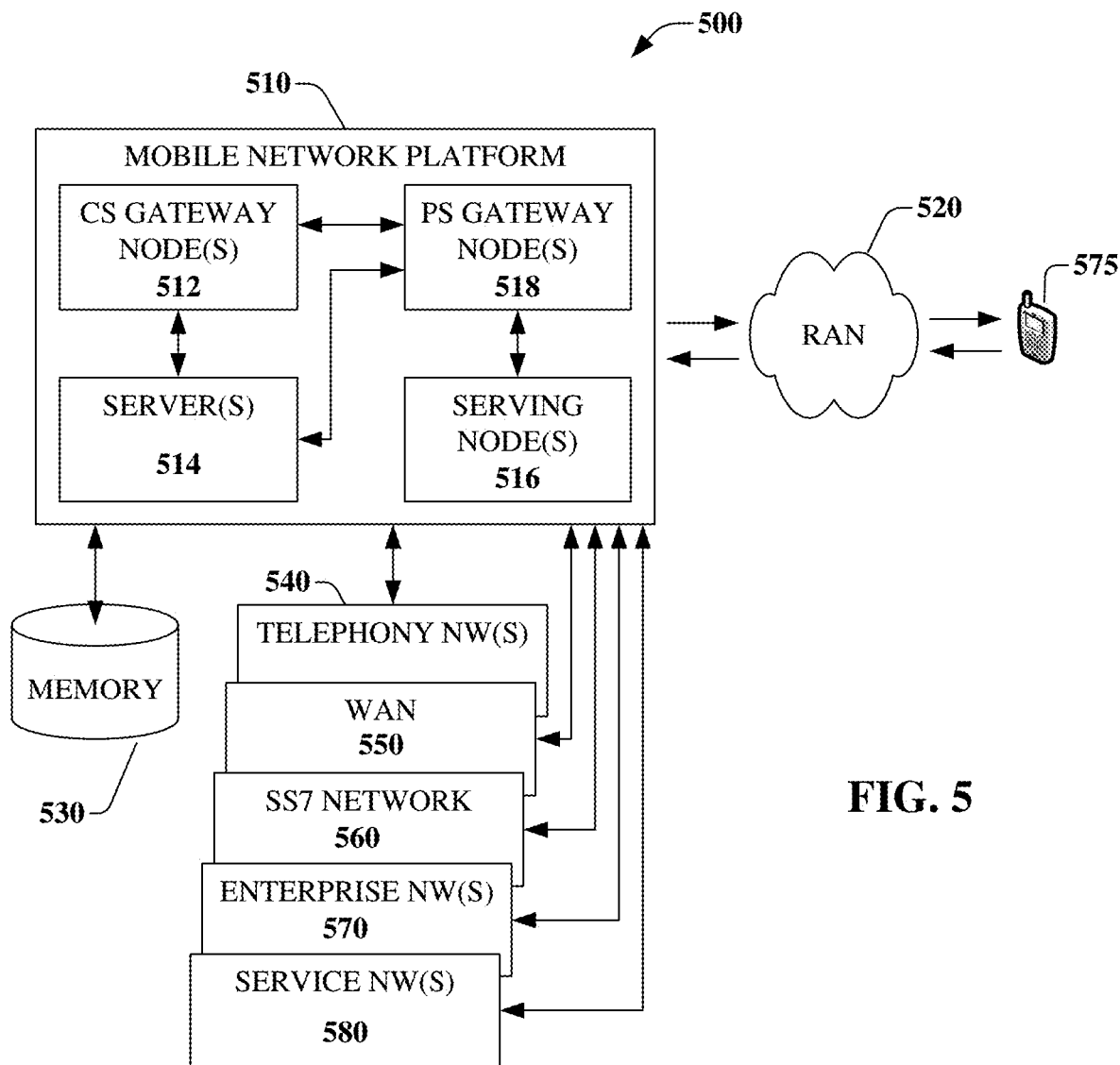
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining a potential risk for introduction of potential bias in a machine learning project, using machine learning models that cluster projects and score the machine learning projects for potential bias. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology or technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
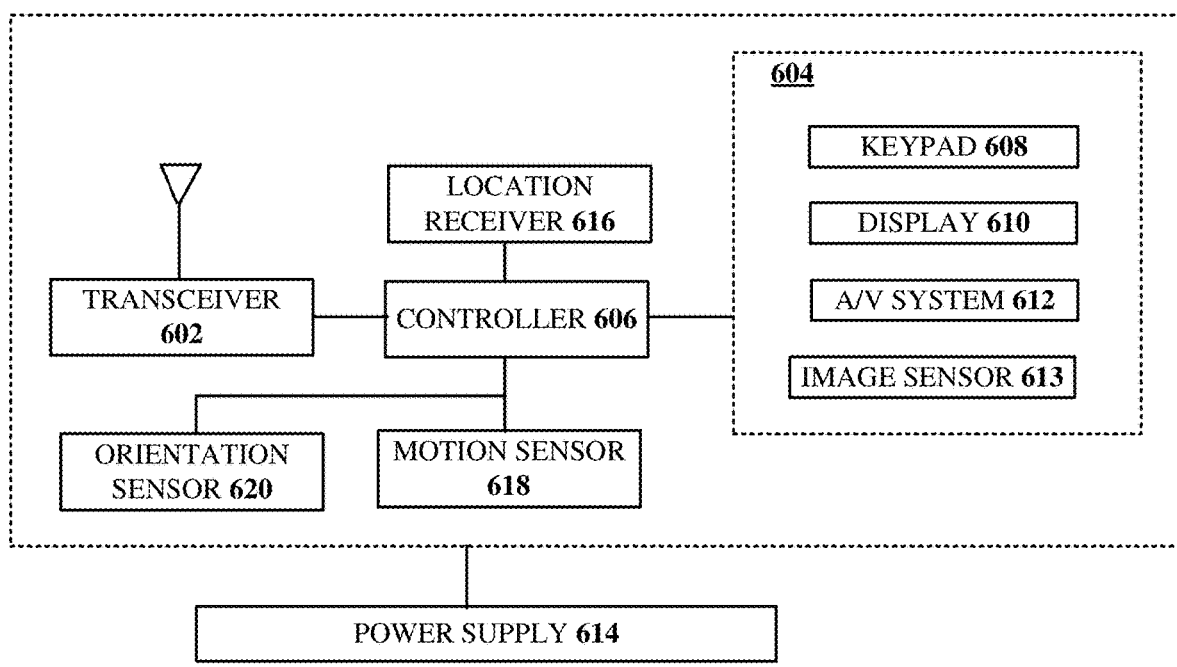
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part determining a potential risk for introduction of bias in a machine learning project, for example using machine learning models to cluster projects and score the machine learning projects for potential bias.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad as the keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ machine learning to facilitate automating one or more features described herein. The embodiments (e.g., in connection with automatically identifying acquired cell sites that provide a maximum value/benefit after addition to an existing communication network) can employ various ML-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistically-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to separate the triggering criteria from the non-triggering ones. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the words "example" or "exemplary" is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   receiving proposed project data for a proposed project, wherein the receiving proposed project data comprises receiving machine learning (ML) data;
   extracting features and metadata of the proposed project data;
   providing the features and metadata of the proposed project data to a clustering model, wherein the clustering model comprises an ML model;
   identifying a clustering assignment for the proposed project from the clustering model;
   training the clustering model based on the clustering assignment;
   providing the clustering assignment for the proposed project and the features of the proposed project and the metadata of the proposed project to a bias scoring model, wherein the bias scoring model comprises an ML model;
   determining, from the bias scoring model, an indication of risk of potential bias for the proposed project;
   determining, a bias risk score;
   determining a list of bias factors affecting the bias risk score, wherein respective bias factors of the list of bias factors may be adjusted to reduce the risk of potential bias for the proposed project;
   identifying a list of one or more projects having similar bias characteristics as the proposed project, wherein the identifying the list of the one or more projects comprises performing a cosine similarity operation on vector representations of the proposed project and vector representations of the one or more projects; and
   training the bias scoring model based on a plurality of other projects, wherein the plurality of other projects are ML projects, wherein the training the bias scoring model comprises: retrieving from a project database, the project data from the other projects, wherein the retrieving the project data comprises retrieving extracted features of the other projects and metadata of the other projects; and applying the extracted features of the proposed project and the metadata of the proposed project, and the extracted features of the other projects and the metadata of the other project to the ML model;
storing the project data in the project database, wherein the storing comprises storing the project data with other project data for other projects; and wherein the training the bias scoring model based on the plurality of other projects comprises training the bias scoring model based on the other projects stored in the project database;
receiving subsequent project data defining a subsequent proposed project;
determining a clustering assignment for the subsequent proposed project using the ML model; and
updating the ML model wherein the updating the ML model comprises assigning, based on the subsequent project data, the subsequent proposed project to one cluster of the plurality of clusters of projects and reassigning, based on the subsequent project data, one or more projects of the other projects to different clusters of the plurality of clusters of projects.

2. The device of claim 1, wherein the operations further comprise:
providing a recommendation for reducing a risk of potential bias for the proposed project, wherein the providing the recommendation for reducing the risk of potential bias is based on one or more of the bias risk score, the list of bias factors affecting the bias risk score, and a list of one or more other projects having similar bias characteristics as the proposed project.

3. The device of claim 2, wherein respective other projects of the one or more other projects are ML projects.

4. The device of claim 2, wherein the operations further comprise:
assigning the one or more other projects to a respective cluster of a plurality of clusters; and
determining the clustering assignment for the proposed project to a particular cluster of the plurality of clusters, wherein the determining the clustering assignment is based on the features and metadata of the proposed project data.

5. The device of claim 1, wherein the operations further comprise:
training the clustering model based on a plurality of other projects, wherein the plurality of other projects are ML projects.

6. The device of claim 5, wherein the extracting features and metadata of the proposed project data comprises extracting the features and metadata using a natural language processing algorithm.

7. The device of claim 1, wherein the operations further comprise:
providing a recommendation for reducing a risk of potential bias for the proposed project.

8. The device of claim 7, wherein the providing the recommendation comprises providing a recommendation to review at least one project on the list of one or more other projects to analyze if the at least one project included a previously undetected bias.

9. The device of claim 1, wherein the extracting features and metadata of the proposed project data comprises:
extracting features of the proposed project from the ML data, wherein the extracting comprises extracting keywords from a textual project description of the proposed project using a TextRank algorithm.

10. The device of claim 1, wherein the operations further comprise:

providing a recommendation for reducing a risk of potential bias for the proposed project, including providing a list of similar projects, wherein respective projects of the list of similar projects may be evaluated to determine how a risk of potential bias for a respective project of the list of similar projects was reduced.

11. A method, comprising:
receiving, by a processing system including a processor, proposed project data for a proposed project, wherein the receiving proposed project data comprises receiving machine learning (ML) data;
extracting, by the processing system, features and metadata of the proposed project data;
providing, by the processing system, the features and metadata of the proposed project data to a clustering model, wherein the clustering model comprises an ML model;
identifying, by the processing system, a clustering assignment for the proposed project from the clustering model;
training, by the processing system, the clustering model based on the clustering assignment;
providing, by the processing system, the clustering assignment for the proposed project and the features of the proposed project and the metadata of the proposed project to a bias scoring model, wherein the bias scoring model comprises an ML model;
determining, by the processing system, from the bias scoring model, an indication of risk of potential bias for the proposed project;
determining, by the processing system, a bias risk score;
determining, by the processing system, a list of bias factors affecting the bias risk score, wherein respective bias factors of the list of bias factors may be adjusted to reduce the risk of potential bias for the proposed project;
identifying, by the processing system, a list of one or more projects having similar bias characteristics as the proposed project, wherein the identifying the list of the one or more projects comprises performing a cosine similarity operation on vector representations of the proposed project and vector representations of the one or more projects; and
training, by the processing system, the bias scoring model based on a plurality of other projects, wherein the plurality of other projects are ML projects, wherein the training the bias scoring model comprises: retrieving, by the processing system, from a project database, the project data from the other projects, wherein the retrieving the project data comprises retrieving extracted features of the other projects and metadata of the other projects; and applying the extracted features of the proposed project and the metadata of the proposed project, and the extracted features of the other projects and the metadata of the other project to the ML model;
storing, by the processing system, the project data in the project database, wherein the storing comprises storing the project data with other project data for other projects; and wherein the training the bias scoring model based on the plurality of other projects comprises training the bias scoring model based on the other projects stored in the project database;
receiving, by the processing system, subsequent project data defining a subsequent proposed project;

determining, by the processing system, a clustering assignment for the subsequent proposed project using the ML model; and updating, by the processing system, the ML model wherein the updating the ML model comprises assigning, based on the subsequent project data, the subsequent proposed project to one cluster of the plurality of clusters of projects and reassigning, based on the subsequent project data, one or more projects of the other projects to different clusters of the plurality of clusters of projects.

12. The method of claim 11, further comprising:

determining, by the processing system, the clustering assignment for the proposed project to a cluster of a plurality of clusters, wherein each other project of the plurality of other projects is assigned to a respective cluster of the plurality of clusters, and wherein the determining the clustering assignment is based on the features and metadata of the proposed project data.

13. The method of claim 11, wherein the extracting features and metadata of the proposed project data comprises extracting the features and metadata using a natural language processing algorithm.

14. The method of claim 11, further comprising:

providing a recommendation to review at least one of the plurality of other projects to analyze if the at least one of the plurality of other projects included a previously undetected bias.

15. A non-transitory machine-readable medium, comprising executable instructions that, when executed by a processing system including a processor, facilitate performance of operations, the operations comprising:

receiving proposed project data for a proposed project, wherein the receiving proposed project data comprises receiving machine learning (ML) data;

extracting features and metadata of the proposed project data;

providing the features and metadata of the proposed project data to a clustering model, wherein the clustering model comprises an ML model;

identifying a clustering assignment for the proposed project from the clustering model;

training the clustering model based on the clustering assignment;

providing the clustering assignment for the proposed project and the features of the proposed project and the metadata of the proposed project to a bias scoring model, wherein the bias scoring model comprises an ML model;

determining, from the bias scoring model, an indication of risk of potential bias for the proposed project;

determining, a bias risk score;

determining a list of bias factors affecting the bias risk score, wherein respective bias factors of the list of bias factors may be adjusted to reduce the risk of potential bias for the proposed project;

identifying a list of one or more projects having similar bias characteristics as the proposed project, wherein the identifying the list of the one or more projects comprises performing a cosine similarity operation on vector representations of the proposed project and vector representations of the one or more projects; and training the bias scoring model based on a plurality of other projects, wherein the plurality of other projects are ML projects, wherein the training the bias scoring model comprises: retrieving from a project database, the project data from the other projects, wherein the retrieving the project data comprises retrieving extracted features of the other projects and metadata of the other projects; and applying the extracted features of the proposed project and the metadata of the proposed project, and the extracted features of the other projects and the metadata of the other project to the ML model;

storing the project data in the project database, wherein the storing comprises storing the project data with other project data for other projects; and wherein the training the bias scoring model based on the plurality of other projects comprises training the bias scoring model based on the other projects stored in the project database;

receiving subsequent project data defining a subsequent proposed project;

determining a clustering assignment for the subsequent proposed project using the ML model; and updating the ML model wherein the updating the ML model comprises assigning, based on the subsequent project data, the subsequent proposed project to one cluster of the plurality of clusters of projects and reassigning, based on the subsequent project data, one or more projects of the other projects to different clusters of the plurality of clusters of projects.

16. The non-transitory machine-readable medium of claim 15, further comprising:

providing, by the processing system, a list of similar projects, wherein respective projects of the list of similar projects may be evaluated to determine how a risk of potential bias for a respective project of the list of similar projects was reduced.

17. The non-transitory machine-readable medium of claim 15, wherein the extracting features and metadata of the proposed project data comprises extracting the features and metadata using a natural language processing algorithm.

18. The non-transitory machine-readable medium of claim 17, wherein the extracting features and metadata of the proposed project data comprises extracting keywords from a textual project description of the proposed project using a TextRank algorithm.

19. The non-transitory machine-readable medium of claim 17, wherein the extracting features and metadata of the proposed project data comprises extracting keywords from a textual project description of the proposed project using a term frequency-inverse document frequency (TF-IDF) algorithm.

20. The non-transitory machine-readable medium of claim 15, wherein the operations further comprise providing a recommendation to review the list of one or more projects to analyze if the list of one or more projects included a previously undetected bias.

* * * * *